United States Patent Office 3,154,286
Patented Oct. 27, 1964

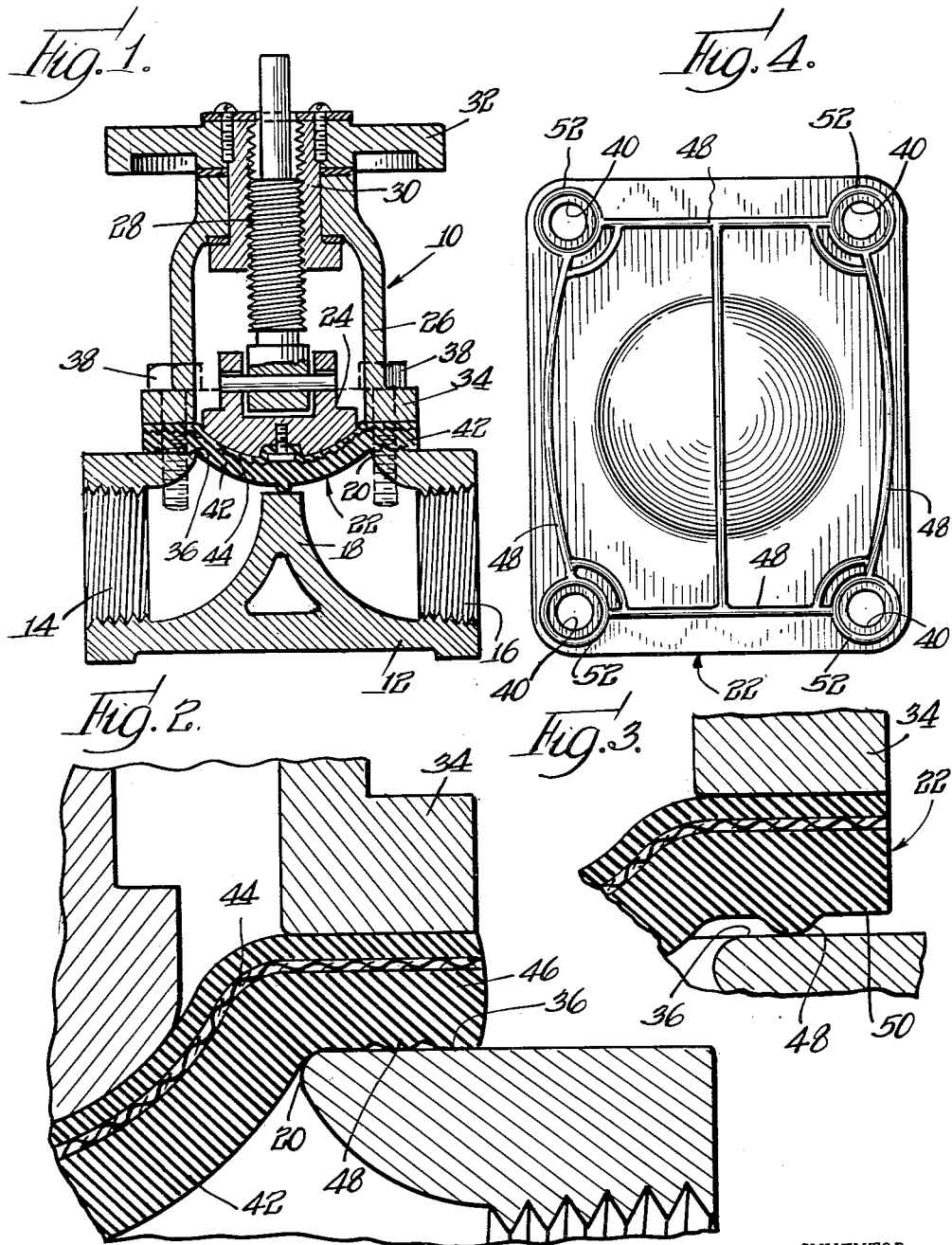

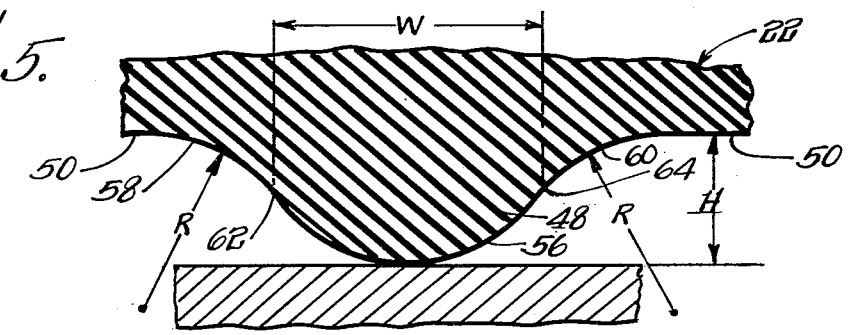
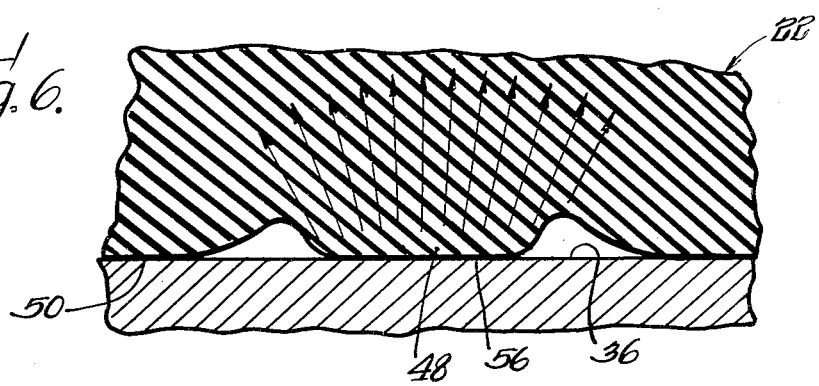
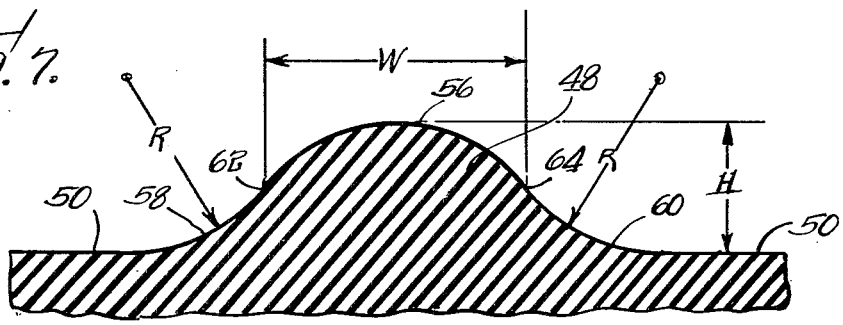
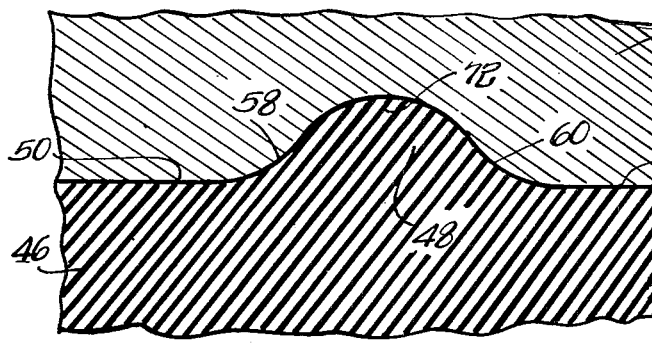

3,154,286
WEIR VALVE
Rolland McFarland, Jr., Crystal Lake, Ill., assignor to Hills-McCanna Company, Chicago, Ill., a corporation of Illinois
Filed Nov. 3, 1960, Ser. No. 66,972
2 Claims. (Cl. 251—331)

The present invention relates to valves through which the flow of fluid is controlled by the positional relationship of a flexble diaphragm to a transverse weir.

In a weir valve of this character, the flexible weir is ordinarily positioned generally between a valve body defining the weir and a bonnet disposed in covering relation to the weir. The peripheral edge of the weir, which is usually formed of a yieldable elastomeric material, is firmly clamped between a flange on the valve bonnet and an underlying support surface on the valve body.

The physical characteristics of the elastomeric diaphragm material are such that the marginal edge of a diaphragm will yield or creep over a period of time, when subjected to the compressive forces by which it is clamped between the valve body and the valve bonnet. The effect of this is to relax the pressure with which the marginal edge of the diaphragm is held against the valve body, with consequent weakening of the compressive seal established between the diaphragm and the valve body.

One object of the invention is to provide a new and improved weir valve in which a diaphragm advantageously formed of an elastomeric material is dependably sealed to a coacting valve body surface against the escape of fluid over a long service life, even though the structure of the diaphragm to which sealing pressure is applied is subject to yielding under load.

Another object is to provide a new and improved weir valve in which a fully effective sealing of the valve diaphragm against a coacting valve body surface is assured, over a substantially unlimited period of time, by virtue of a critical shaping and dimensioning of critical diaphragm structure which opposes the coacting valve body surface.

Another object is to provide, for use in a weir valve of the character recited, a flexible valve diaphragm formed of an elastomeric material and including sealing means adapted to form a long lasting effective seal against a coacting body surface, said sealing means being shaped and proportioned to assure maximum strength in the sealing means and providing an assured absence of inperfections in the juncture of the sealing means with the main body of the diaphragm.

Other objects and advantages will become apparent from the following description of the exemplary embodiment of the invention illustrated in the drawings, in which:

FIGURE 1 is a vertical sectional view of a weir valve forming the illustrated embodiment of the invention;

FIG. 2 is a fragmentary sectional view on a greatly enlarged scale, showing a marginal edge portion of the valve diaphragm clamped between the valve bonnet and the valve body;

FIG. 3 is an enlarged fragmentary sectional view corresponding to the central portion of FIG. 2 and illustrating the shaping of a marginal edge of the valve diaphragm before clamping pressure is applied by the valve bonnet and the underlying body support surface;

FIG. 4 is a bottom view of the valve diaphragm;

FIG. 5 is a fragmentary transverse sectional view of the sealing bead on the valve diaphragm, showing the relation of the bead to an underlying valve body surface before clamping pressure is applied to the bead;

FIG. 6 is a view similar to FIG. 5 but illustrating the relationship of the sealing bead to the adjacent body structure of the diaphragm after clamping is applied to the bead;

FIG. 7 is an enlarged, transverse sectional view of the valve diaphragm sealing bead, showing the bead inverted from the position of the bead in FIG. 5 and identifying critical dimensions of the bead structure; and FIG. 8 is a fragmentary sectional view on an enlarged scale, showing a transverse sectional view of a diaphragm sealing bead located within the mold in which the diaphragm is formed.

Referring to the drawings in greater detail, the weir valve 10 forming the exemplary embodiment of the invention illustrated comprises a valve body 12 defining two alined inlet and outlet passages 14, 16 separated by a transverse weir 18 forming an integral part of the body 12. As shown, the weir 18 projects upwardly across a center line between the outer ends of the openings 14, 16.

The side of the body 12 opposite from the upwardly projecting weir 18 defines a generally rectangular opening 20 which is covered by a flexible flow control diaphragm 22. The diaphragm 22 is flexed toward and away from the weir 18, to close and open the valve by means of a convex compressor element or actuator 24 movably mounted within a valve bonnet 26 disposed in covering relation to the diaphragm, as will presently appear.

The compressor element 24 is guided within the bonnet 26 for translation toward and away from the weir 18, and is moved toward and away from the weir by means of a threaded operating stem 28 which coacts with a threaded bushing 30 journaled in the upper end of the bonnet 26 and operated, in the present instance, by the control wheel 32.

The peripheral marginal edge of the diaphragm 22 is clamped between a peripheral flange 34 on the bonnet 26 and a flat support surface 36 formed on the marginal edge of the body 12 defining the opening 20 covered by the diaphragm. As shown, the bonnet 26 is secured to the body 12 and tightened against the diaphragm by means of four stud bolts or cap screws 38. The fastening elements 38 extend through the bonnet flange 34 and pass through four openings 40 in the four corners of the diaphragm 22, which has a generally rectangular shape, as shown in FIG. 4.

The generally rectangular over-all form of the diaphragm 22 is centrally dished to provide for flexing of the diaphragm toward and away from the weir 18 without stretching the diaphragm structure. The long dimension of the diaphragm is generally parallel to the transverse weir 18.

Structurally, the diaphragm 22 comprises a thick, resilient body 42 formed of a suitable elastomeric material which is resistant to the fluid controlled by the valve. The body 42 is internally reinforced against stretching by means of one or more layers of a suitable reinforcing material 44 embedded in the elastomeric body, as shown in FIGS. 1 and 2.

As previously intimated, the peripheral marginal edge 46 of the diaphragm 22 is subjected to clamping or compressive forces designed to create a fluid tight seal between the diaphragm and the body surface 36 supporting the diaphragm. In an effort to intensify the sealing pressure between the valve diaphragms and valved bodies, it has been the practice in the construction of some commercial weir valves of this type to form protruding beads on the peripheries of the diaphragms to engage the coacting support surfaces on the valve bodies. A sealing bead of this general character is provided on the diaphragm 22 in the exemplary embodiment of the invention illustrated and identified by the reference number 48.

It will be noted that the sealing bead 48 protrudes downwardly from a flat surface 50 on the underside of the peripheral marginal edge of the diaphragm.

As illustrated in FIG. 4, the sealing bead 48 extends along the underside of the entire peripheral marginal edge of the diaphragm. At the four corners of the diaphragm, the bead 48 encircles the diaphragm openings 40 to aid in forming an effective seal around the diaphragm openings. The portions of the bead 48 which encircle the openings 40 are identified by the number 52.

The protruding bead 48, upon being clamped against the underlying body surface 36, tends to intensify the sealing pressure between the protruding surface of the bead and the body surface. This is of value in providing a more effective seal between the diaphragm and the valve body.

However, it has been found that the effectiveness of the bead 48 in maintaining a seal over a protracted period of time can be radically diminished by the tendency of the elastomeric body material of the diaphragm to relax under the compressive load to which it is subjected. Thus, the physical characteristics of the material which forms and supports the bead 48 greatly complicate the matter of maintaining over a period of time an effective sealing pressure between the bead and the underlying support surface 36.

Moreover, the effectiveness of bead 48 in forming a seal with the supporting body surface 36 can be materially weakened by a tendency for weaknesses and imperfections to be concentrated at the base of the bead as an incident to normal moulding of the diaphragm.

It has been found that such weaknesses and imperfections in the structure of the sealing bead 48 can be effectively eliminated, while at the same time providing in the bead an inherent ability to maintain a fully effective seal against a coacting surface 36 over a prolonged service life, even though the elastomeric material forming and supporting the bead tends to relax under load. Thus, as will presently appear, the bead 48 when shaped and proportioned as taught by the invention will provide, upon installation of the diaphragm into the valve, a continuing dynamic resistance to compression which assures maintenance of an effective seal against the escape of fluid between the diaphragm and valve body.

Thus, as illustrated in transverse section in FIG. 5, and in the inverted, transverse sectional view of FIG. 7, the diaphragm sealing bead 48 shaped and proportioned in accordance with this invention defines a reversely curved external surface which includes, as viewed in transverse section, a convex crown surface 56 which spans the full effective width across which sealing pressure is applied upon clamping of the diaphragm between the bonnet 26 and the valve body 12. The opposite side edges of the convex crown surface 56 of the bead 48 merge with two concave side surfaces 58, 60 of the bead which merge tangentially with the flat surface 50 on the underside of the marginal edge of the valve diaphragm defining the bead.

The critical proportionate shaping of the bead 48 can be most accurately described in relation to the maximum height of the bead above the flat face surface 50 at the base of the bead when the bead is unstressed in its relaxed condition. This height of the bead is identified in FIGS. 5 and 7 by the letter H.

As previously intimated, the effective width of the bead is regarded as the width of the crown surface 56 between the opposite side edges 62, 64 of the crown surface where the curvature of the bead, as viewed in transverse section, reverses to form the concave surfaces 58, 60. This width of the bead is identified in FIGS. 5 and 7 by the letter W.

The concave bead surfaces 58, 60 have radii of curvature which are critical in the proportionate shaping of the bead 48. The radii of curvature of the surfaces 58, 60 are equal to each other and are identified in FIGS. 5 and 7 by the letter R.

The proportionate shaping of the bead 48 is such that the width W of the bead has a dimensional value between the limits of one and one-half times the dimensional height H of the bead and two and one-half times the bead height H. Moreover, the radius R of each of the concave surfaces 58, 60 lies between a lower limit equal to the height H of the bead and an upper limit equal to one and one-half times the bead height H.

Upon clamping of the diaphragm 22 between the bonnet 26 and the body 12, the protruding bead 48 and the underlying elastomeric bead support structure in the diaphragm body are compressed, flattening the initially convex bead surface 56 and pushing it into flush relation to the adjacent face surface 50, as illustrated in FIG. 6. Because of the proportionate shaping of the bead 48 described, the bead thus formed will provide an optimum sealing pressure across the flattened crown of the bead and, more significantly, will maintain the effectiveness of this sealing pressure over a prolonged service life, by virtue of the capability of the bead to maintain a continuing dynamic resistance to compression, despite the characteristics of the elastomeric material from which the bead and diaphragm body are formed.

The diaphragm bead 48 is molded integrally with the diaphragm body 46 in a mold 70, the bead forming portion of which is illustrated in transverse section in FIG. 8 in interfitting relation to adjacent structure of a diaphragm formed in the mold. The mold 70 defines a bead groove 72 which is shaped to form the diaphragm bead described.

The critical proportionate shaping of the diaphragm bead 48 avoids the concentration of mold separating fluid at the base of the bead 48 in the vicinity of the concave bead surfaces 58, 60. Thus, the bead shaped in this manner is, upon being molded integrally with the diaphragm body 46, free of imperfections in the bead structure, including that portion of the base of the bead defining the surfaces 58, 60. This assured structural integrity of the molded bead guarantees the full effectiveness of the seal provided between the diaphragm and the valve body.

The invention is claimed as follows:

1. A weir valve comprising, in combination, a valve body defining inlet and outlet passages and forming a transverse weir between said passages positioned to cause any flow of liquid between the passages to pass over the weir, a valve bonnet removably secured to said body in covering relation to said weir, a flexible diaphragm interposed between said bonnet and said body in covering relation to said weir and having a peripheral marginal edge clamped between said body and said bonnet, a movable diaphragm actuator mounted in said bonnet to engage said diaphragm to controllably move the latter toward and away from said weir, said body defining an endless edge surface supporting the marginal edge of said diaphragm, said diaphragm having an elastomeric body, said peripheral marginal edge of said diaphragm defining a generally flat endless edge surface confronting said endless body surface, said peripheral marginal edge of said diaphragm defining when in its unstressed condition an endless raised bead protruding from said edge surface on the diaphragm toward said endless body surface in confronting relation thereto, said bead extending continuously around said peripheral marginal edge of said diaphragm in inwardly spaced relation to the extreme edge of the diaphragm, said bead being shaped to define as viewed in transverse section a reversely curving surface which includes a raised central surface that merges along its opposite sides with two concave side surfaces which in turn merge with portions of said flat diaphragm edge surface which extend along opposite sides of the bead, said bead having a transverse width across said raised central surface and between the junctures of said concave side surfaces with opposite sides of said raised central surface which is at least one and one-half times the maximum height of said bead above the adjacent diaphragm edge surface and not more than two and one-half times said bead height, and each of said concave bead surfaces having a radius of curvature as viewed in transverse section which is at least equal to said bead height but not greater than one and one-half times said bead height whereby said bead forms a lasting high pressure seal between said diaphragm and said endless edge surface on said body as an incident to clamping of said peripheral marginal edge between said body and said bonnet.

2. A weir valve comprising, in combination, a valve body defining inlet and outlet passages and forming a transverse weir between said passages positioned to cause any flow of fluid between the passages to pass over the weir, a valve bonnet removably secured to said body in covering relation to said weir, a flexible diaphragm formed of a reinforced moulded body of elastomeric material and being interposed between said bonnet and said valve body in covering relation to said weir and having a peripheral marginal edge clamped between said body and said bonnet, a movable diaphragm actuator mounted in said bonnet to engage said diaphragm to controllably move the latter toward and away from said weir, said body defining an endless edge surface supporting the marginal edge of said diaphragm, said peripheral marginal edge of said diaphragm defining an endless edge surface confronting said endless body surface, said peripheral marginal edge of said diaphragm defining when in its unstressed condition an endless raised bead moulded integrally with said diaphragm body from an elastomeric material and protruding from said edge surface on the diaphragm toward said endless body surface in confronting relation thereto, said bead extending continuously along said peripheral marginal edge of said diaphragm in inwardly spaced relation to the extreme edge of the diaphragm, said bead in its unstressed condition being shaped to define as viewed in transverse section a reversely curving surface which consists of a convex central surface that merges along its opposite side edges with two concave surfaces which in turn merge with portions of said diaphragm surface which extend along opposite sides of the bead, said bead having a transverse width across said central surface and between the junctures of said concave side surfaces with opposite sides of said central surface which is at least one and one-half times the maximum height of said bead above adjacent portions of said diaphragm edge surface and not more than two and one-half times said maximum bead height; and each of said concave bead surfaces having a radius of curvature as viewed in transverse section which is at least equal to said bead height but not greater than one and one-half times said bead height whereby said bead is moulded free of imperfections at the base of the bead and forms, upon clamping of said peripheral marginal edge between said body and said bonnet, a lasting high pressure seal between said diaphragm and said endless edge surface on said valve body.

References Cited in the file of this patent
UNITED STATES PATENTS
2,302,930     Anderson _____ Nov. 24, 1942